Patented Aug. 10, 1926.

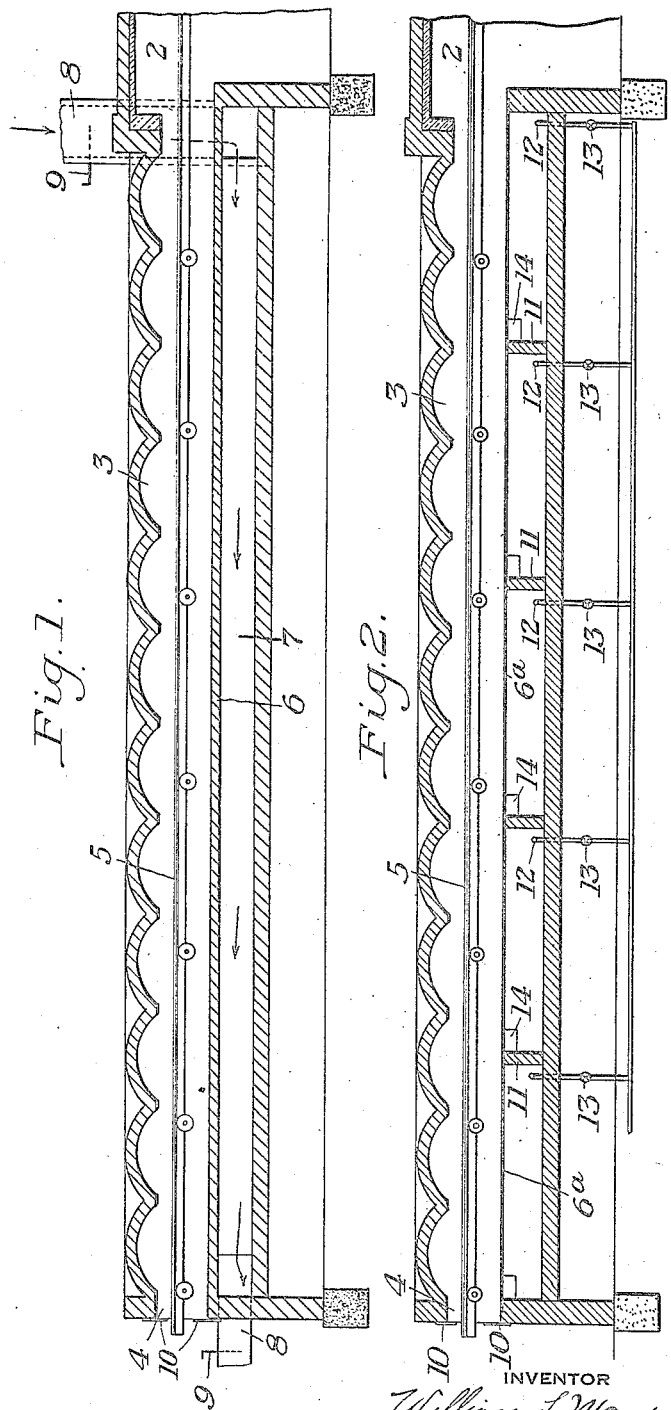

1,595,912

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD OF ANNEALING AND COOLING SHEET GLASS.

Application filed February 12, 1924. Serial No. 692,247.

The invention relates to a method and apparatus for annealing and cooling sheet glass and is particularly useful in connection with apparatus having as a source of heat a chamber wherein a previous operation is performed upon the glass, such as a flattening oven or a glass drawing apparatus, although the invention is not in any way limited thereto.

In the annealing and cooling of sheet glass, it has been found that if a horizontally extending leer tunnel of uniform cross section is used and all of the gases supplied to one end thereof are permitted to travel uninterruptedly the entire length of the tunnel, the gas stream above the glass will be hotter than the stream below. The result is that the lower face portion of the sheets cools more rapidly than the upper face portion, and the glass is warped when delivered from the leer tunnel.

This is probably due, at least in part, to the fact that the hotter gases in the tunnel naturally rise to the upper portions thereof while the cooler gases remain at the bottom. As a result of this condition, it is found that in the ordinary leer the gases flow along the upper portion of the tunnel and leave its mouth at relatively higher velocity, while in the lower portion thereof toward its outlet end the gas movement is more sluggish. This allows cold air to enter the lower portion of the delivery end of the leer tunnel and move along within it, this accentuating the unequal temperature conditions between the top and bottom portions of the leer tunnel. The shrinkage of the gases in cooling as they flow through the tunnel accentuates this defect.

To overcome this, I provide for supplying flat hot glass to a horizontally extending leer tunnel, supplying streams of gases to the tunnel above and below the glass level adjacent one end of the tunnel, permitting the streams to travel through the tunnel and adding heat to the lower stream in amounts sufficient to substantially equalize the rate of heat loss from the two faces of the glass. This is preferably accomplished by a heating flue or flues under the floor of the leer tunnel, which serves to convey heat to the gases in the lower portion of the tunnel. As a result, the gas temperature below the glass is maintained more nearly equal to that above the glass in the leer tunnel and warping of the product is thereby avoided or reduced.

In the accompanying drawings, which illustrate the preferred embodiment of my invention as applied to a flattening oven and connected leer tunnel for working on glass formed by the cylinder process,—

Figure 1 is a vertical, longitudinal section through a portion of a flattening oven and connected leer tunnel embodying my invention, and Figure 2 is a similar view showing a modified form of apparatus.

In the embodiment of the invention shown in Figure 1, there is shown a flattening oven 2 having a horizontally extending leer tunnel 3 connected therewith. The oven 2 is heated in any desired manner and heated gases from the oven pass through the leer tunnel 3 toward the delivery opening 4. Leer rods 5 of any suitable construction are placed in the leer tunnel for supporting and moving the glass as it travels therethrough, and when the leer is in operation these rods are effective for supporting the glass sheets in such manner as to form a substantially continuous partition through the leer tunnel, so that the hot gases from the flattening oven 2 are divided into two streams; one above and one below the glass level.

It will be understood that the term "flattening oven", as used herein, refers to the oven as a whole and is intended to include not only that portion of the apparatus where the glass is actually flattened, but also the so-called dummy oven, cooling oven and piling oven, as will be well understood by those skilled in the art.

As hot gases travel from the flattening oven 2 through the leer tunnel 3, the cooler portions of the gases find their way to the lower portion of the leer tunnel 3 and the hotter gases move toward the top of the tunnel. In order to compensate for this natural tendency, I provide a relatively thin floor 6 for the leer tunnel 3 and place a heating flue or muffle thereunder. Conduits 8 having dampers 9 therein are provided for introducing and taking off the heating gases from the end portions of the conduit 7 and one of them is connected with a suitable stack or blower (not shown) for providing a suitable pressure difference.

It is preferred that the heating gases enter the muffle 7 adjacent the flattening oven 2 and travel concurrently with the gases and the glass in the leer tunnel 3, since the entire apparatus is intended to decrease in temperature toward the delivery opening 4. This is indicated by arrows in Figure 1 of the drawings. By suitably regulating the dampers 9, it will be found that the hot gases in the muffle 7 will heat the floor 6 sufficiently to materially raise the temperature of the gases in the bottom portions of the leer tunnel and thereby at least partially balance the rate of heat loss from the two faces of the glass in the leer. The radiation effect between the lower face of the glass sheet and the leer tunnel 6 is also altered materially and this also serves to maintain the lower portion of the sheet in a heated condition longer than would ordinarily be the case.

It will be found that the heating of the gases in the lower portion of the tunnel is effective for preventing the ingress of cool air through the delivery opening 4, since the gases in the tunnel are not so greatly reduced in volume and are also maintained at a more uniform temperature. The provision of the heated floor also serves to maintain more nearly uniform the velocities of the streams above and below the glass, since the shrinkage of the gases in the two streams is more nearly equalized. The relative velocities of the two streams may also be regulated somewhat by adjustable shades 10 placed above and below the glass supporting rods 5 at the delivery end of the leer.

Figure 2 shows a modified form of apparatus wherein the space below the floor 6ª is divided into a series of compartments by partition walls 11. A burner 12 is provided in each compartment, each burner preferably extending substantially the width of the compartment. Fuel is supplied from a gas main and each burner is provided with an inlet valve 13. A stack outlet 14 for the products of combustion is provided for each chamber.

By this apparatus the quantity of heat supplied at the various portions of the leer tunnel may be regulated as desired.

I provide for annealing and cooling sheet glass by supplying streams of heated gases to the tunnel above and below the glass level, permitting the streams to travel through the tunnel, and adding heat to the lower stream in adjusted amounts sufficient to substantially equalize the rate of heat loss from the two faces of the glass. Generally speaking, the adjustment of the amount of heat supplied to the lower stream will be by manipulation of the dampers 9 or the valves 13, but it will be understood that such an adjustment may be secured by other means or may be in the nature of a permanent adjustment provided for in the construction of the apparatus.

While I have illustrated the invention as applied to glass working apparatus wherein the heated gases travel in the same direction as the glass, it will be understood that the invention is not limited to such forms of apparatus, but may be otherwise embodied within the scope of the following claims.

I claim:

1. In the method of producing substantially flat sheet glass, the steps consisting in supplying flat hot glass to a horizontally extending leer tunnel, supplying streams of heated gases to the tunnel above and below the glass level adjacent the end of the tunnel where the glass enters and permitting streams to travel through the tunnel in contact with the glass, and adding heat to the lower stream in adjusted amounts sufficient to compensate for the difference in temperature and velocity of the lower stream as compared with the upper stream so as to prevent warping of the sheet and insure the production of substantially flat sheet glass, substantially as described.

2. In the method of producing substantially flat sheet glass, the steps consisting in supplying flat hot glass to a horizontally extending leer tunnel, supplying streams of heated gases to the tunnel above and below the glass level adjacent one end of the tunnel and permitting streams thereof to travel through the tunnel in contact with the glass, and adding heat to the lower stream in adjusted amounts sufficient to compensate for the difference in temperature and velocity of the lower stream as compared with the upper stream so as to prevent warping of the sheet and insure the production of substantially flat sheet glass, substantially as described.

3. In the method of making substantially flat sheet glass, the steps consisting in supplying flat hot glass from a heated chamber where an operation is performed on the glass to a horizontally extending leer tunnel connected to said chamber, permitting hot gases from the chamber to flow through the leer tunnel in streams above and below the glass level and in contact with the glass, and adding heat to the lower stream in adjusted amounts sufficient to compensate for the difference in temperature and velocity of the lower stream as compared with the upper stream so as to substantially prevent warping or bowing of the sheet and thus insure the production of substantially flat glass, substantially as described.

4. In the method of making substantially flat sheet glass, the steps consisting in supplying flat hot glass to a horizontally extending leer tunnel, supplying streams of gases to the tunnel above and below the glass level adjacent one end of the tunnel and permitting the streams to travel therethrough in contact with the glass, and substantially continuously heating the floor of the tunnel in adjusted amounts so as to compensate for the difference in temperature and velocity of the lower stream as compared with the upper stream and thereby prevent warping or bowing of the sheet glass, thus insuring the production of substantially flat sheet glass, substantially as described.

5. In the method of producing substantially flat sheet glass, the steps consisting in supplying flat hot glass from a heated flattening oven to a horizontally extending leer tunnel conected to the flattening oven, permitting gases to flow from the oven through the tunnel in streams above and below the glass level, and adding heat to the lower stream in adjusted amounts sufficient to compensate for the difference in temperature and velocity of the lower stream as compared with the upper stream and thereby prevent warping or bowing of the glass sheet, thus insuring the production of substantially flat sheet glass, substantially as described.

In testimony whereof I have hereunto set my hand.

WILLIAM L. MONRO.